(12) United States Patent
Sarhaluoma et al.

(10) Patent No.: US 12,325,407 B2
(45) Date of Patent: Jun. 10, 2025

(54) MOBILE WORKING MACHINE, CONTROL SYSTEM AND METHOD FOR CONTROLLING MOBILE WORKING MACHINE

(71) Applicant: Ponsse Oyj, Vieremä (FI)

(72) Inventors: Anssi Sarhaluoma, Vieremä (FI); Vesa Koirikivi, Vieremä (FI); Mika Keränen, Vieremä (FI); Jukka Karppinen, Vieremä (FI); Petri Nousiainen, Vieremä (FI); Jukka Tossavainen, Vieremä (FI)

(73) Assignee: Ponsse Oyj, Vieremä (FI)

( * ) Notice: Subject to any disclaimer, the term of this patent is extended or adjusted under 35 U.S.C. 154(b) by 197 days.

(21) Appl. No.: 17/910,267

(22) PCT Filed: Mar. 8, 2021

(86) PCT No.: PCT/FI2021/050168
§ 371 (c)(1),
(2) Date: Sep. 8, 2022

(87) PCT Pub. No.: WO2021/181006
PCT Pub. Date: Sep. 16, 2021

(65) Prior Publication Data
US 2023/0128377 A1   Apr. 27, 2023

(30) Foreign Application Priority Data

Mar. 9, 2020   (FI) ...................................... 20205248

(51) Int. Cl.
*B60T 8/88*   (2006.01)
*B60L 1/00*   (2006.01)
(Continued)

(52) U.S. Cl.
CPC .............. *B60T 8/885* (2013.01); *B60L 1/003* (2013.01); *B60L 3/12* (2013.01); *B60T 8/92* (2013.01);
(Continued)

(58) Field of Classification Search
None
See application file for complete search history.

(56) References Cited

U.S. PATENT DOCUMENTS

| 9,902,387 B2 * | 2/2018 | Perain | B60W 10/30 |
| 2004/0060206 A1 * | 4/2004 | Ichimura | F15B 19/005 37/348 |

(Continued)

FOREIGN PATENT DOCUMENTS

| CN | 1696517 | 11/2005 |
| CN | 102811021 | 12/2012 |

(Continued)

OTHER PUBLICATIONS

International Search Report and Written Opinion of the ISA dated May 25, 2021, for PCT/FI2021/050168, 13 pp.
(Continued)

*Primary Examiner* — Daniel L Greene
(74) *Attorney, Agent, or Firm* — Nixon & Vanderhye PC

(57) ABSTRACT

In the solution put forth, a pressure level of a pump in a hydraulic transmission system of a hydraulic working machine, or power that is feedable to an electric drive motor of an electric working machine is monitored, and/or the rotation speed at the output of the drive motor of the working machine and the rotation of moving means of the working machine are monitored. The pressure level of the hydraulic power transmission pump, or the power feedable to an electric drive motor, is compared with a lower threshold value to detect a fault situation, and/or the rotation speed at
(Continued)

the output of the drive motor is compared with the rotation of the moving means also to detect a fault situation. In case a fault situation is detected, the braking system of the working machine is controlled to apply the brakes.

21 Claims, 2 Drawing Sheets

(51) Int. Cl.
    *B60L 3/12*     (2006.01)
    *B60T 8/92*     (2006.01)

(52) U.S. Cl.
    CPC ....... *B60L 2200/40* (2013.01); *B60L 2240/42* (2013.01); *B60L 2240/421* (2013.01); *B60L 2240/461* (2013.01); *B60L 2240/486* (2013.01); *B60L 2240/642* (2013.01); *B60T 2210/20* (2013.01); *B60T 2240/00* (2013.01); *B60T 2250/00* (2013.01)

(56) References Cited

U.S. PATENT DOCUMENTS

| | | | |
|---|---|---|---|
| 2009/0133951 A1 | 5/2009 | Schultz et al. | |
| 2010/0065355 A1* | 3/2010 | Reddy | B60W 10/30 165/104.31 |
| 2014/0023523 A1* | 1/2014 | Berg | E02F 9/2292 417/364 |
| 2016/0296848 A1 | 10/2016 | Taylor et al. | |
| 2018/0065629 A1* | 3/2018 | Wolff | B60W 30/18009 |
| 2019/0168784 A1* | 6/2019 | Wyatt | B61D 9/00 |

FOREIGN PATENT DOCUMENTS

| | | |
|---|---|---|
| CN | 103382951 | 11/2013 |
| CN | 109249918 | 1/2019 |
| EA | 032946 | 8/2019 |
| EP | 1 350 990 | 10/2003 |
| EP | 1 361 378 | 11/2003 |
| EP | 1 674 766 | 6/2006 |
| JP | 2013-213517 | 10/2013 |
| JP | 6514118 | 5/2019 |
| RU | 4435 U1 | 8/2003 |
| RU | 2010126176 | 1/2012 |
| WO | 2019/225198 | 11/2019 |

OTHER PUBLICATIONS

Finnish Search Report dated Nov. 24, 2020, for FI Application No. 20205248, 2 pp.
Finnish Action dated May 26, 2021, for FI Application No. 20205248, 7 pp.
Mar. 27, 2024 Search Report issued in European Patent Application No. 21767919.0, pp. 1-21.
May 31, 2024 Office Action issued in Chinese Patent Application No. 202180019916.X, pp. 1-8 [machine translation included].
May 5, 2023 Search Report issued in Russian Patent Application No. 2022126152/11(057067), pp. 1-2.
May 10, 2023 Office Action issued in Russian Patent Application No. 2022126152/11(057067), pp. 1-6 [machine translation included].
Apr. 1, 2025 Office Action issued in Chinese Patent Application No. 202180019916, pp. 1-8 [machine translation included].

* cited by examiner

MOBILE WORKING MACHINE, CONTROL SYSTEM AND METHOD FOR CONTROLLING MOBILE WORKING MACHINE

CROSS-REFERENCE TO RELATED APPLICATION(S)

This application is the U.S. national phase of International Application No. PCT/FI2021/050168 filed Mar. 8, 2021, which designated the U.S. and claims priority to FI 20205248 filed Mar. 9, 2020, the entire contents of each of which are hereby incorporated by reference.

BACKGROUND

The invention relates to mobile working machines and a method as well as a control system for controlling the working machine, and to a software product.

Mobile working machines are used in demanding conditions, such as uneven terrain and slopes. If a component of a working machine on a slope, for example, breaks down or develops a fault, it is most challenging to control the working machine due to the situation happening so fast, despite an operator having the chance to activate an operating brake or an emergency stop pushbutton.

BRIEF DESCRIPTION OF THE INVENTION

It is thus an object of the invention to develop a new working machine, control system and method, as well as a software product. The solution according to the invention is characterized by what is disclosed in the independent claims. Preferred embodiments of the invention are disclosed in the dependent claims.

In the solution put forth, a pressure level of a pump in a hydraulic power transmission system of a hydraulic working machine, or power feedable to an electric drive motor of an electric working machine is monitored, and/or the rotation speed at the output of the drive motor of the working machine and the rotation of moving means of the working machine are monitored. The pressure level of the hydraulic power transmission pump, or the power feedable to an electric drive motor, is compared with a lower threshold value to detect a fault situation, and/or the rotation speed at the output of the drive motor is compared with the rotation of the moving means also to detect a fault situation. In case a fault situation is detected, the braking system of the working machine is controlled to apply the brakes. The disclosed solution allows the detection of fault situations of various kinds, and after a fault situation has been detected, the brake of a working machine may be automatically activated and consequently the working machine may be controlled.

BRIEF DESCRIPTION OF THE DRAWINGS

The invention is now described in closer detail in connection with the preferred embodiments and with reference to the accompanying drawings, in which like reference numerals identify like elements.

DETAILED DESCRIPTION OF THE INVENTION

Figure 1:
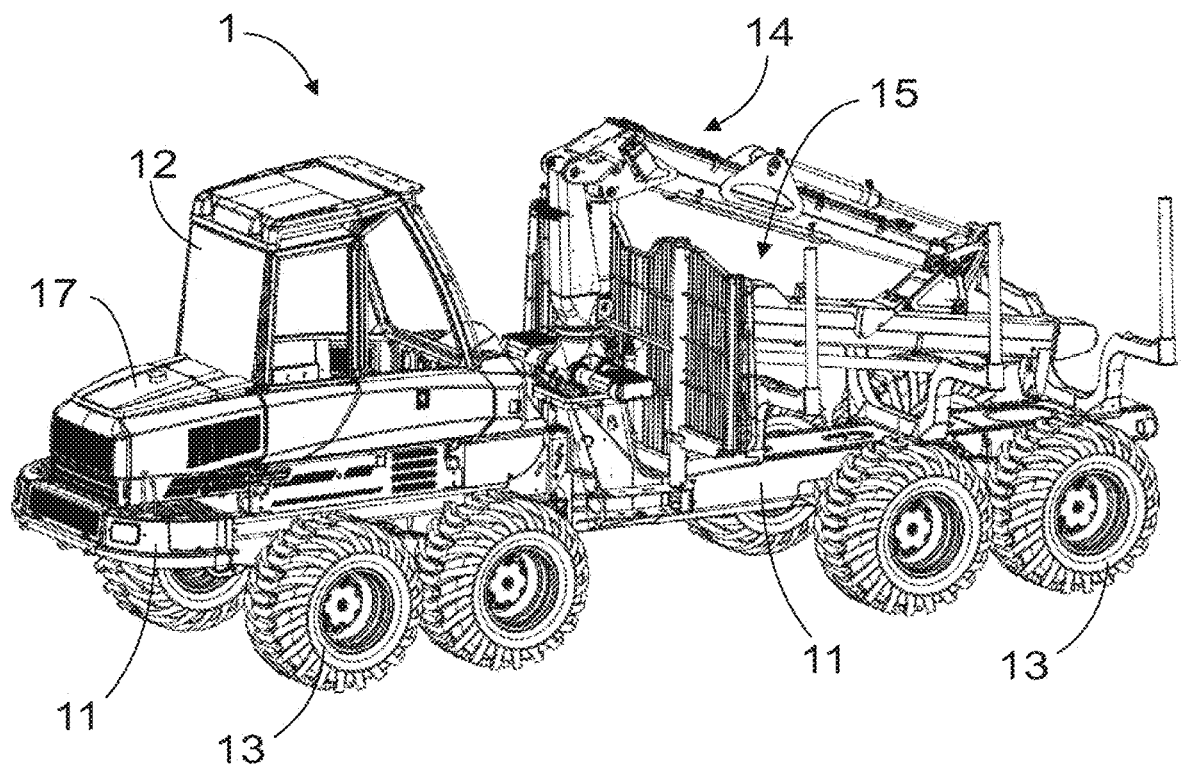
FIG. 1 show a mobile working machine.

These days, mobile working machines are used more and more in demanding conditions such as uneven terrain and slopes. Timber harvesting, for example, in slopes is more and more common. In slope conditions, the load on the working machine is increased when compared with normal conditions on an even surface. Increased loading adds to the strain on the components and shortens their service life. This is why in slope conditions components develop faults, and other fault situations emerge more often than previously.

When a working machine is on a slope and develops a fault condition, due to the situation taking place fast, the working machine may be most challenging to control regardless of the operator having the chance to apply the operating brake or an emergency stop pushbutton. At times, the situation may be so tricky that the operator is not even able to carry out the necessary actions to control the working machine.

As set forth in the above, in the solution put forth, a pressure level of a pump in a hydraulic transmission system of a hydraulic working machine, or power that is feedable to an electric drive motor of an electric working machine is monitored, and/or the rotation speed at the output of the drive motor of the working machine and the rotation of the moving means of the working machine are monitored. The pressure level of the hydraulic power transmission pump, or the power feedable to an electric drive motor, is compared with a lower threshold value to detect a fault situation, and/or the rotation speed at the output of the drive motor is compared with the rotation of the moving means also to detect a fault situation. In case a fault situation is detected, the braking system of the working machine is controlled to apply the brakes. According to an embodiment, braking takes place with a parking brake and/or working brakes. According an embodiment, the lower threshold value of the pump in the hydraulic power transmission system may be 50% or less of the nominal pressure in the hydraulic power transmission system. A fault situation can be detected very fast indeed. Likewise, measures to control the working machine, in other words, activation of the brake, can be carried out fast and reliably.

According to an embodiment, the hydraulic power transmission system comprises a feed pump, a hydraulic drive motor and advantageously a drive pump, and the pressure level of the pump in the hydraulic power transmission system is monitored with a pressure sensor. According to a second embodiment, the drive motor is an electric motor and to monitor the power that is feedable to the feed motor, the voltage level of the device, such as a battery, feeding power to the electric motor is monitored. In the disclosed solutions, the monitoring of the pump pressure level and the power feedable to the drive motor may be implemented in a simple and reliable manner.

According to an embodiment, the rotation speed of the drive motor output is monitored with a rotation speed sensor monitoring the rotation of the drive motor. This way, the monitoring of the output of the drive motor may be implemented with a simple and reliable manner.

According to an embodiment, the rotation of the moving means is monitored with a rotation speed sensor. This way, the monitoring of the rotation of the moving means may be implemented with a simple and reliable manner. Such a sensor may also be simply adapted in connection with a working machine as a retrofit.

According to an embodiment, the rotation speed sensor monitoring the rotation of the moving means is adapted to monitor the rotation of the moving means directly or that of a component, such as a differential gear, immediately connected thereto. In such a case, it is possible to detect fairly extensively potential fault situations related to the drive power transmission.

According to an embodiment, the rotation of the moving means is monitored by monitoring the speed and/or direction of the movement between the working machine and the surface, i.e. the ground. So, the working machine may have a sensor measuring the speed and/or direction of the movement between the working machine and the ground. Such a sensor may be an acceleration sensor of the working machine, for example.

According to an embodiment, the brake system includes a working brake and a parking brake, and in response to detecting a first and/or second fault situation, the control unit is adapted to control at least the parking brake. This way, the working machine may be monitored in an effective, simple and reliable manner.

Figure 2:
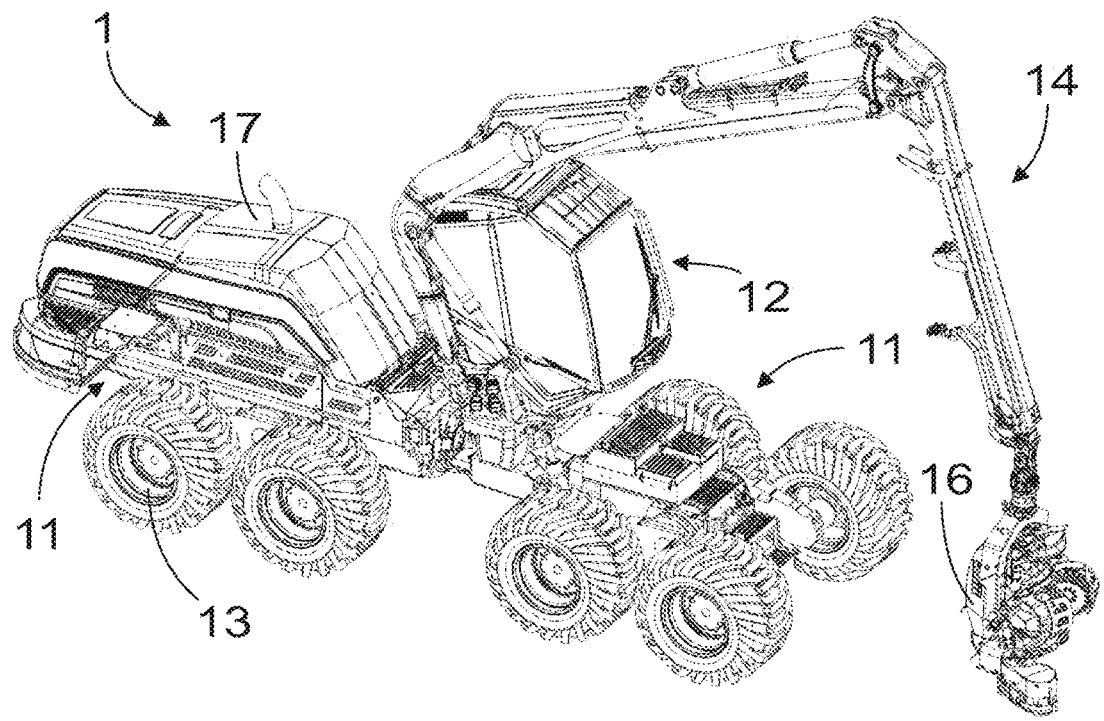
FIG. 2 shows another mobile working machine.

With reference to FIGS. 1 and 2, FIGS. 1 and 2 show working machines. A working machine 1 may comprise a mobile working machine 1 and particularly advantageously a mobile working machine 1 adaptable to move in an inclined and/or uneven surface. Such a mobile working machine may be, for example, a forest work unit, such as a forwarder as in FIG. 1, a harvester as in FIG. 2, or another forest machine, such as a drive machine of another type suitable for carrying a load, or a combination of a forwarder or harvester, or another mobile working machine such as a mining machine or excavator.

The working machine 1 may comprise one or more body parts 11 and a boom structure 14 adapted to the at least one body part. The working machine may also comprise a tool 16 adapted to the boom structure 14, for example. The tool may comprise, for example, a hoisting member, such as a load bucket and/or a wood handling tool, such as a harvester head. The forest machine may be body-steered and comprise at least two body parts 11.

Depending on the embodiment, the working machine 1 may also comprise other structural parts. For example, the working machine 1 may comprise a control cabin 12 adapted on at least one body part 11. The work machine 1 may further comprise moving means 13, which moving means 13 may comprise at least one of the following: wheels adapted on an axle, wheels adapted on a swinging axle, wheels adapted on a tandem axle or a bogie, a track system or another means known per se to cause the work machine to move in relation to its working surface. It will be obvious for a person skilled in the art that the working machine 1 typically comprises numerous additional structural and functional structure parts and entities depending on the type of the working machine, such as a cargo space 15, power source 17, and so forth.

Figure 3:
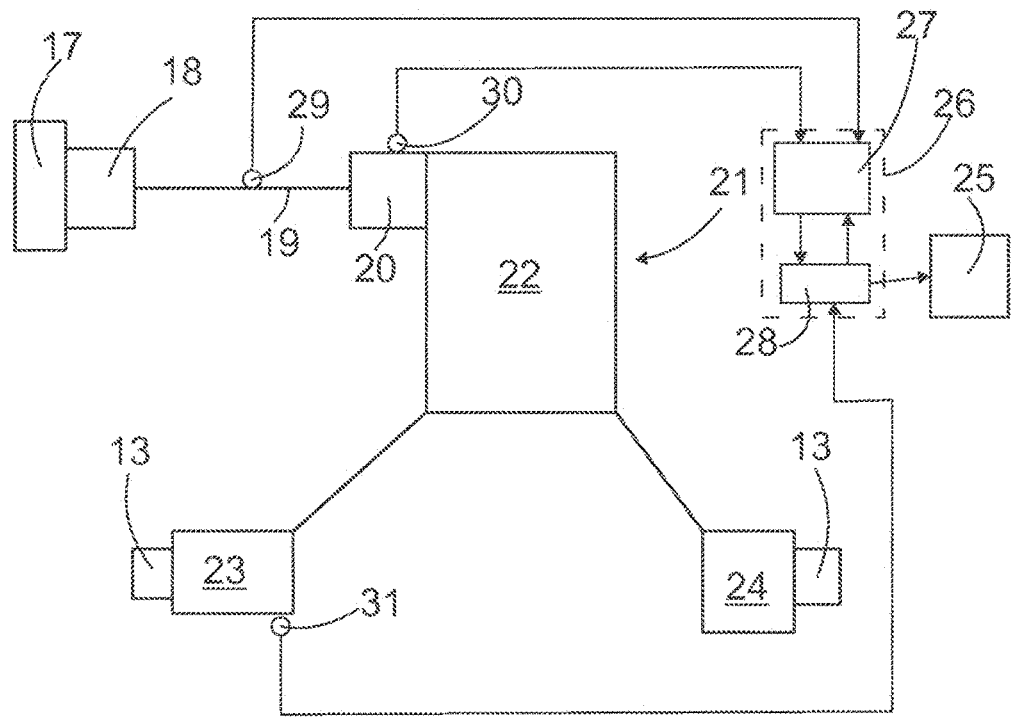
FIG. 3 shows a diagram of some components of a mobile working machine.

FIG. 3 shows a diagram of some components associated with the moving of the mobile working machine 1 and that of some components of the control system. The power source 17, which may be a diesel motor, for example, rotates a feed pump 18. The feed pump 18 produces a volume flow of the hydraulic system 19, and the loading on the hydraulic system produces pressure. With the energy of the hydraulic fluid in the hydraulic system 19, the drive motor 20 is rotated. So, the drive motor 20 in the hydraulic working machine 1 is a hydraulic motor.

In an electric working machine 1, the drive motor 20 is an electric motor. In an electric working machine, energy is supplied to the drive motor 20 by an energy-supplying device such as a battery.

Between the drive motor 20 and moving means 13 there is a drive power transmission 21. The drive power transmission 21 may comprise a mechanical gearbox and mechanical drive power transmission means such as axles, bogies, joints, and so forth. Alternatively, the drive power transmission 21 may be hydraulic or electric. FIG. 3 shows by way of example a gearbox 22, front differential gear 23, and rear differential gear 24 of the drive power transmission. Not all of the components and details thereof in the drive power transmission 21 are shown because they are known and obvious for a person skilled in the art.

FIG. 3 additionally shows brakes 25 as reference. The mobile working machine 1 may have a working brake and a parking brake. It is possible to convey a force to the portion of the brake device forming the working brake used to stop the mobile working machine 1, by means of a pressurized pressure medium such as hydraulic fluid, the force activating the working brake to stop the mobile working machine. In connection with the brake device of the parking brake there may be a flexible member such as a spring which keeps the parking brake activated when no force is applied to the brake device by means of a pressurized pressure medium. So, it is possible to direct a force to the portion of brake device, which forms the parking brake, by a pressurized pressure medium, the force releasing the parking brake, allowing movement of the working machine. When the force effect of the pressure medium to the parking brake is ceased, the parking brake is activated, preventing a parked working machine from starting to move by itself. A typical working machine brake, in particular in forest machine use, is a pressure medium operated, e.g. hydraulically operated, combined working and parking brake whereby the same brake device has means to activate both the parking brake and working brake combined in it. The structural details of the brakes, hydraulic system of the parking brake, and hydraulic system of the working brake are not shown in this context, because the matters in question are known and obvious for a person skilled in the art.

The mobile working machine 1 has a control unit 26. The control unit 26 may be one entity or the control unit may consist of two or more units. In the case of FIG. 3, the control unit 26 consists of a machine control unit 27 and an additional control unit 28. The machine control unit 27 and additional control unit 28 may be joined with a data transfer bus such as a CAN bus.

Information on the operation of the working machine is collected in the control unit 26. This information may be obtained from various sensors, for example. The operation of the working machine is controlled with the control unit 26. In FIG. 3, control of the brakes 25 is presented as an example of such control.

In connection with the feed pump 18 of the hydraulic system 19 there is a pressure sensor 29. The pressure sensor 29 monitors the pressure level of the hydraulic fluid in feed pump of the hydraulic power transmission system, that is, the feed pressure in the hydraulic system 19, and sends information on the pressure level to the control unit 26.

In connection with the drive motor 20 there is a rotation speed sensor 30. The rotation speed sensor 30 monitors the rotation of the drive motor 20 and sends information on the rotation speed of the drive motor 20 to the control unit 26.

In connection with the front differential gear 23 there is a rotation speed sensor 31. The rotation speed sensor 31 monitors the rotation and direction of rotation of the front differential gear 23 and sends information on the rotation speed and the direction of rotation of the front differential gear 23 to the control unit 26.

If it is detected by means of the pressure sensor 29 that the pressure level in the feed pressure of the hydraulic system 19 is too low, in response to detecting too low a pressure level, a control command is given to the brake 25. In such a case, the control unit 26 accordingly activates the brake 25.

The too low a level of the feed pressure in the hydraulic system 19 may be established so that, for example, the pressure sensor 29 passes pressure information on to the control unit 26, and there is a lower threshold value set in the control unit 26. At this point, the control unit 26 compares the pressure information with the lower threshold value, and if the value is below the lower threshold value, gives a control command to the brake 25. The pressure sensor 29 may also be a lower threshold sensor which gives an alarm directly to the control unit 26 in case of a lower value than the lower threshold, and the control unit, upon receiving the alarm, gives a control command to the brake 25.

The normal or nominal pressure of the hydraulic system in a normal usage situation may vary depending on the loading situation, for example, between 20 and 28 bar. In such an embodiment, the lower threshold level of the pressure may be set to 9 bar, for example. Consequently, according to an embodiment, the lower threshold value of the pressure level may be 50% or less of the nominal pressure in the hydraulic power transmission system. The lower threshold value may be set to be fixed, even though the nominal pressure varies, or the lower threshold value may vary in accordance with the variation in the nominal pressure.

In addition to issuing a command for the brakes 25, the control unit 26 may give an alarm indication to a user. The alarm indication may be, for example, switching on an alarm light, such as an LED light, a sound signal, or an alarm symbol displayed on the user interface, or another implementation indicating an alarm to a user.

The too low a level of the feed pressure in the hydraulic system 19 indicates a fault situation of the working machine. In fault situations, hydraulic fluid may be uncontrollably discharged. By monitoring the pressure level, one or more of the following faults may thus be detected: faults in joints/dampers (between the flywheel and pumps), most of drive pump faults, most of drive motor faults, broken hoses in drive hydraulics, feed pump faults, leaks in the systems using the feed pressure, such as the transfer cylinder in the gearbox.

The disclosed solution allows the detection of fault situation, specifically. Instead, possible pressure variations in the drive motor resulting from changes in the loading, for example, are not fault situations detected with the solution set forth.

Instead of or in addition to controlling the brakes on the basis of too low a level of the feed pressure in the hydraulic system 19, disclosed in the above, the brakes may be controlled according to information provided by the rotation speed sensors 30 and 31. The implementation may also be described so that a fault situation is detected by means of the pressure sensor 29 and/or rotation speed sensors 30 and 31, and in response to detecting the fault situation, a control command is given to the brakes 25.

The idea of an embodiment is that the control unit 26 in this case actives the parking brake for use. The idea of a second embodiment is that the control unit 26 in this case actives the working brake for use. The idea of yet another embodiment is that the control unit 26 in this case actives both the working brake and parking brake for use.

In a normal situation, the drive motor 20 rotates at a particular speed and the front differential 23 rotates at a speed having a particular ratio in relation to the rotation of the drive motor 20. This ratio is determined by the drive power transmission 21. In the disclosed solution, the control unit 26 compares the rotation speed information of the rotation speed sensor 30 of the drive motor 20 with the rotation speed information of the rotation speed sensor 31 of the front differential gear 23. If there is a larger difference between the rotation speeds than in a normal situation, the control unit 26 gives a control command to the brake 25 and an alarm indication to a user. The direction information of the rotation speed sensor 31 of the front differential gear 23 may be utilized by comparing the obtained direction information, indicating the movement direction of the moving means 13, with the direction that the moving means 13 should be moving based on the output of the drive motor 20. If the movement direction of the moving means 13 differs from the desired one, a control command is given to the brake 25 and an alarm indication to the user. So, if the working machine 1 starts to move in another direction than the desired direction, the brakes 25 are activated.

The rotation speed sensor 30 of the drive motor 20 is a sensor monitoring the rotation speed of the drive motor 20, so the rotation speed at the output of the drive motor 20, so the rotation speed of the shaft of the drive motor 20. The rotation speed of the drive motor 20 output may also be monitored by for example calculating it on the basis of the throughput of the pump of the drive power transmission and motor angle, that is, the displacement of the motor.

The rotation speed sensor 31 of the front differential gear 23 is a sensor monitoring the rotation of the moving means 13. Thus, the rotation of the moving means 13 may be monitored with a rotation speed sensor that monitors the rotation of the differential. According to an embodiment, the rotation of the moving means 13 may be monitored with a rotation speed sensor that monitors the rotation of the moving means 13 directly or that of a component, such as a wheel axle, differential, or bogey, immediately connected to the moving means 13. When the rotation of the moving means 13 or that of a component immediately connected thereto is directly monitored with the rotation speed sensor, possible fault situations may be fairly extensively detected insofar as the drive power transmission is concerned.

According to an embodiment, the rotation of the moving means 13 is detected by monitoring the speed and/or direction of the movement between the working machine 1 and the surface, i.e. the ground. So, the working machine 1 may have a sensor measuring the speed and/or direction of the movement between the working machine 1 and the surface. Such a sensor may be an acceleration sensor of the working machine 1, for example. Such an acceleration sensor may be separate or integrated into the control unit 26.

The disclosed solution may also be described so that what is detected is the rotation speed of the output of the drive motor 20 for moving the working machine 1, in other words, how the working machine 1 should be moving (direction and speed of movement). From the moving means 13, the actual speed and direction of movement of the working machine 1 is detected. If the detection from the moving means 13 differs from the detection obtained from the drive motor 20, this is a fault situation. This way, fault situations related to the drive power transmission 21 may be extensively detected. The detectable fault may be one or more of the following faults: gearbox getting damaged, gearbox out of gear, bogey fault, fault in the drive shaft, breaking of the drive motor shaft.

According to an embodiment, if the values between the rotation speed at the output of the drive motor 20 and the comparable rotation speed measured from the moving means differ from each other by more than 3% of the nominal motor rotation speed, the situation is determined a fault situation. According to a second embodiment, a fault situation is determined to be a deviation of more than 5% or a deviation of more than 10%.

The working machine 1 may have a sensor to monitor whether the working machine is on a slope. Such a sensor may be separate or integrated into the control unit 26. Because the above fault situations may be more difficult to control when the working machine 1 is on a slope, the system may be adapted such that it is activated when it has been detected that the working machine 1 is on a slope.

Figure 4:
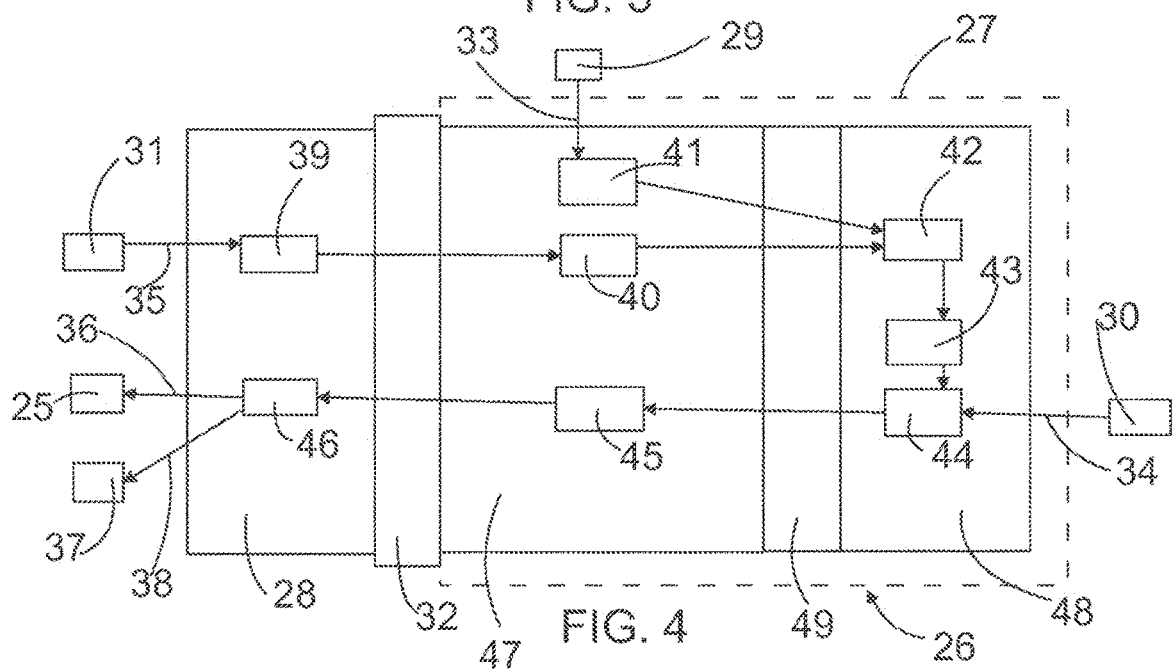
FIG. 4 shows a diagram of a control system of a mobile working machine.

FIG. 4 illustrates the control system of the working machine 1. The control unit 26 comprises a machine control unit 27 and an additional control unit 28. The machine control unit 27 may comprise a first control module 47 and a second control module 48. Reference number 49 illustrates information transfer between the modules 47 and 48 and the data transfer protocol. Instead of using the first control module 47 and second control module 48, the control unit may naturally be implemented by using one control module, only, or there may also be more than two control modules.

The additional control unit 28 is connected to the first control module 47 by a data transfer bus 32. The first control module 47 has an input for a pressure signal 33 of the pressure sensor 29. Correspondingly, the second control module 48 has an input for the rotation speed signal 34 of the rotation speed sensor 30, and the additional control unit 28 has an input for the rotation speed signal 35 of the rotation speed sensor 31.

A block 41 of the first control module 47 receives the pressure signal 33 and forwards it to a block 42 of the second control module 48. A block 39 of the additional control unit 28 receives the rotation speed signal 35 of the rotation speed sensor 31 and sets a time stamp in it. The block 39 forwards the rotation speed signal and time stamp to a block 40 of the first control module 47. The block 40 receives the rotation speed signal and time stamp, and forwards them to the block 42 of the second control module 48.

The block 42 of the second control module 48 thus receives the information from the blocks 40 and 41 and forwards them to the block 43. The block 43 takes into account the effect of the drive power transmission 21, that is, converts the value of the rotation speed signal 35 of the rotation speed sensor 31 comparable with the rotation speed signal 34 of the rotation speed sensor 30. The block 43 forwards the information to the logic block 44.

So, the logic block 44 receives the information from the block 43. In addition, the logic block 44 receives the rotation speed signal 34 of the rotation speed sensor 30. The logic block 44 compares the value of the pressure signal 33 with the lower threshold value and, if the value is below the lower threshold value, gives a control command to the block 45 of the first control module 47. In addition, the logic block 44 also compares the value of the rotation speed signal 34 of the rotation speed sensor 30 with the comparable value of the rotation speed signal 35 of the rotation speed sensor 31, and if the values differ too much from each other, gives a control command to the block 45 of the first control module 47. The values may be defined to differ from each other by too much when, for example, the difference between the values is more than 3% of the nominal maximum value of the motor rotation speed. If the nominal maximum value of the motor is, for example, 4500 rpm, the value indicating a fault situation may be, for example, 200 rpm.

The block 45 of the first control module 47 thus receives a control command from the logic block 44. The block 45 forwards the control command to the block 46 of the additional control unit 28.

The block 46 of the additional control unit 28 receives the control command and forms the brake control signal 36 and the control signal 38 of the alarm device. The block 46 sends the brake control signal 36 via the brake control signal output to the brakes 25, and the control signal 38 of the alarm device via the control signal output of the alarm device to the alarm device 37.

The control system described in connection with FIG. 4 may also be referred to as an automatic brake control system. According to an embodiment, if the alarm device 37 is an indicator light such as an LED light, the control signal 38 of the alarm device may control the indicator light to be continuously on when the system is in use and operates normally. When the system is not in use or has a fault condition, the control signal 38 of the alarm device may control the indicator light to turn off. When the system gives a brake control signal 36 to control the brakes 25, the control signal 38 of the alarm device may control the indicator light to blink.

The control unit 26 shown in FIG. 4 may thus comprise the additional control unit 28, first control module 47, and second control module 48 as parts of the equipment. The additional control unit 28 receives the sensor pulses/signal from the moving means 13 and controls the activation of the brakes 25 and the alarm device 37. The additional control unit 28 is connected to the first control module 47. The first control module 47 conveys information/messages between the additional control unit 28 and second control module 48. The second control module 48 contains operation logic which compares initial data, makes deductions, and defines control commands based on them.

The automatic brake control system disclosed here may be retrofitted to an existing working machine 1, too. The existing working machine 1 may have a first control module 47, second control module 48, pressure sensor 29, sensor 30 of the drive motor 20, and the brakes 25, obviously. When being retrofitted, the only physical devices that must be installed in the working machine 1 are a sensor in connection with the moving means 13, alarm device 37, and additional control unit 28. In addition, the required computer program changes need to be carried out in the control unit 26.

The computer program product in the control unit 26 comprises computer-readable program code which is arranged to implement the functions of the disclosed automatic brake control system or the steps of the method that carries out the functions as the program code is being performed by a processor. The control unit 26 comprises processing means or a processor. The control unit 26 may comprise memory in which information has been gathered and stored as well as is being gathered and stored. The processing means may be adapted to carry out at least part of the process steps and/or operations disclosed in this specification. In an embodiment, the processing means may be adapted to receive and send information and commands. The processing means may comprise a programmable logic and/or programmable microprocessor, for example. The processing means may form the control unit 26 or a part thereof.

An embodiment comprises a computer program comprising a program code which, when executed on a computer, executes functions according to any of the embodiments described above. The computer program may be included in a computer-readable storage medium, for instance in a non-volatile memory.

An embodiment comprises a computer program product comprising a computer program according to an embodiment for executing functions according to any of the embodiments described above.

In an embodiment, the apparatus comprises processing means configured to execute functions described in an embodiment. The processing means may serve as a computer for executing the program code. The processing means may comprise at least one processor, memory and program platform capable of executing the program code.

The embodiments can be implemented as a computer process that is defined by a computer program. The computer program may be in source code format, object code format or an intermediate format, and the computer program can be stored on a storage medium that may be any piece or apparatus that is capable of storing the computer program. For instance, a computer program can be stored on a computer program distribution medium that can be read by a computer or processor. The computer program distribution medium may comprise a storage medium, computer memory, read-only memory (ROM), electric carrier wave, telecommunications signal, and software distribution package, for instance.

In an embodiment, a computer program product may be stored on a computer-readable media and executable by a processor, and the computer program product may comprise computer-readable program code. This type of computer program product may be arranged to execute at least some of the steps in the method described above, when the program code is run in a processor.

The computer program being run in the control unit 26 has natural delays caused by the execution of the program steps and forwarding information. The processor speed and other characteristics of the equipment affect the operating speed. Additional delays may be caused by reliability performance. Despite this, the disclosed solution allows a control command to be given in much less than 1 second from the emergence of a fault situation to control the brake 25. According to an embodiment, the operating delay of the control system is less than 600 ms, advantageously less than 400 ms.

Due to reliability performance, one of more of the following conditions may be defined. A specific allowed tolerance is given for the difference between the rotation speed sensors, and a fault situation is defined as this tolerance is exceeded. Furthermore, it may be defined that a certain number of situations where a value is exceeded, or error messages must be present before a fault situation is defined to have taken place. For example, it may be defined in connection with starting that a running condition of the power source 17 must be met over a plurality of successive calculation rounds before a fault situation may be defined for a low feed pressure. This way it is made sure that the pressure level has enough time to rise in connection with starting a diesel engine, for example.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. A mobile working machine, comprising:
a body,
moving means,
a hydraulic power transmission system,
a drive motor,
a drive power transmission between the drive motor and moving means,
a brake system,
means for monitoring the rotation speed of an output of the drive motor,
means for monitoring the rotation of the moving means, and
a control unit configured to detect a fault situation by comparing the rotation speed of the output of the drive motor with the rotation of the moving means, wherein the control unit, in response to detecting the fault situation, is further configured to control the brake system to brake.

2. The working machine as claimed in claim 1, wherein the hydraulic power transmission system comprises a feed pump and a hydraulic drive motor, the drive motor being a hydraulic motor, and the working machine comprising a pressure sensor configured to monitor the pressure level of the pump of the hydraulic power transmission.

3. The working machine as claimed in claim 1, wherein the means for monitoring the rotation speed of the output of the drive motor comprise a rotation speed sensor configured to monitor the rotation of the drive motor.

4. The working machine as claimed in claim 1, wherein the means for monitoring the rotation of the moving means comprise a rotation speed sensor.

5. The working machine as claimed in claim 4, wherein the rotation speed sensor for monitoring the rotation of the moving means is configured to monitor the rotation of the moving means directly, or that of a component immediately connected thereto.

6. The working machine as claimed in claim 5, wherein the rotation speed sensor for monitoring the rotation of the moving means is configured to monitor the rotation of a differential gear.

7. The working machine as claimed in claim 1, wherein the brake system includes a working brake and a parking brake, and in response to detecting the fault situation, the control unit is configured to control at least the parking brake.

8. The working machine as claimed in claim 1, further comprising a sensor configured to monitor whether the working machine is on a slope, and the control unit is configured to control the brake system to brake in response to detecting the fault situation only when the sensor has detected that the working machine is on a slope.

9. The working machine as claimed in claim 1, being a forest work machine.

10. A control system of a mobile working machine, the control system comprising:
means for monitoring the rotation speed of an output of a drive motor of the working machine,
means for monitoring the rotation of moving means of the working machine, and
a control unit being configured to detect a fault situation by comparing the rotation speed of the output of the drive motor with the rotation of the moving means, wherein the control unit, in response to detecting the fault situation, is further configured to provide a control command to the brake system of the working machine.

11. The control system as claimed in claim 10, further comprising a pressure sensor configured to monitor the pressure level of a pump of a hydraulic power transmission system of the working machine.

12. The control system as claimed in claim 10, wherein the means for monitoring the rotation speed of the output of the drive motor comprise a rotation speed sensor configured to monitor the rotation of the drive motor.

13. The control system as claimed in claim 10, wherein the means for monitoring the rotation of the moving means comprise a rotation speed sensor.

14. The control system as claimed in claim 13, wherein the rotation speed sensor for monitoring the rotation of the moving means is configured to monitor the rotation of the moving means directly, or that of a component immediately connected thereto.

15. The control system as claimed in claim 14, wherein the rotation speed sensor for monitoring the rotation of the moving means is configured to monitor the rotation of a differential gear.

16. A method for controlling a mobile working machine, the method comprising:
   monitoring a rotation speed of an output of a drive motor of the working machine,
   monitoring the rotation of moving means of the working machine,
   comparing the rotation speed of the output of the drive motor with the rotation of the moving means to detect a fault situation, and
   in response to detecting the fault situation, controlling the brake system of the working machine to brake.

17. The method as claimed in claim 16, wherein the rotation speed of the output of the drive motor is monitored by a rotation speed sensor, via which the rotation of the drive motor is monitored.

18. The method as claimed in claim 16, wherein the rotation of the moving means is monitored by a rotation speed sensor.

19. The method as claimed in claim 18, wherein the rotation speed sensor for monitoring the rotation of the moving means directly monitors the rotation of the moving means or that of a component immediately connected thereto.

20. The method as claimed in claim 19, wherein the rotation speed sensor for monitoring the rotation of the moving means monitors the rotation of a differential gear.

21. A non-transitory computer-readable media storing computer-readable program code that, when executed, is configured to coordinate with a processor to perform the method according to claim 16.

* * * * *